Oct. 18, 1966  J. M. QUARTARARO  3,279,334
METHOD OF CONSTRUCTION IN PERMAFROST REGIONS
Filed Jan. 18, 1962
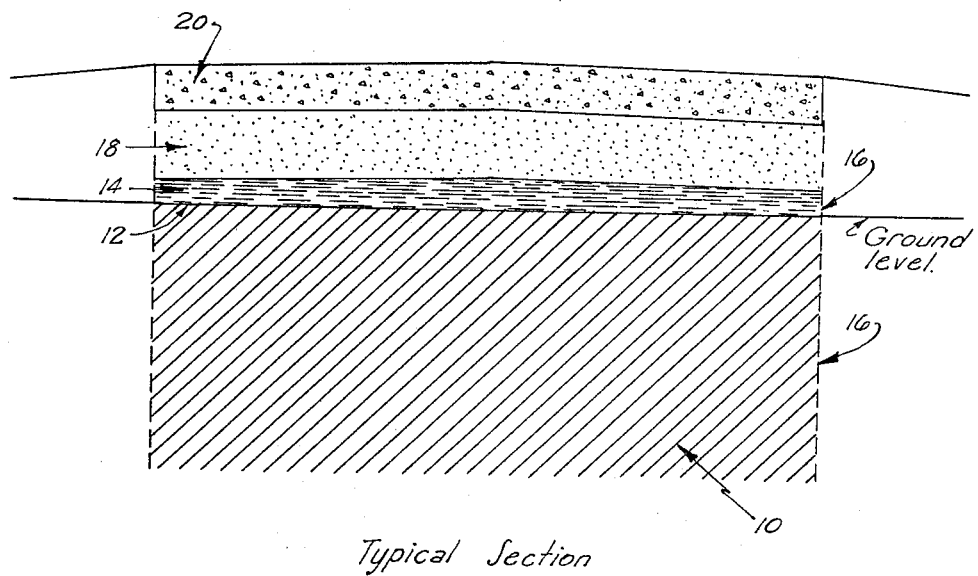
Typical Section

3,279,334
METHOD OF CONSTRUCTION IN PERMAFROST REGIONS
Jack M. Quartararo, 115 Livingston St., Poughkeepsie, N.Y.
Filed Jan. 18, 1962, Ser. No. 167,049
3 Claims. (Cl. 94—7)

This invention relates to construction in arctic and subarctic zones, as well as to other areas in which the temperatures remains below 32° F. for extended periods of time throughout the year and more particularly to a method of preparing ground areas of permafrost areas to carry heavy loads even during thaw periods.

It is an object of the present invention to provide a method of bringing the frost level in arctic and subarctic areas up to ground level and maintaining it, and making use of this ground level ice or frozen material as a means of supporting various types of roads, air fields, railroad beds, building foundations and pavements or other man-made structures of any kind.

It is a further object to provide a method of retaining the frost level in temperate climates and thereby maintaining a firm foundation on all roads and pavements of any kind until a definite spring thaw, thereby reducing "frost heave" and temporary winter thaws to a minimum.

Another object of the present invention is to provide a manner of construction to maintain the frozen nature of the ground in arctic and sub-arctic regions during periods of thaw, so as to continue to withstand large loads during these thawing periods and to continue to support structures built thereon.

Other and more detailed objects of the invention will be apparent from the following description of the preferred embodiment elected for illustration in the attached drawing, wherein:

FIGURE 1 shows a cross-section of a road constructed in accordance with the present invention.

Ordinarily, vast regions of the sub-arctic and arctic zones are solidly frozen during the winter months and hence capable of supporting heavy loads such as heavy equipment or any type of four-wheeled vehicles, without danger of them becoming bogged down. This frozen ground is commonly referred to as "permafrost." A highly undesirable conditions of permafrost is that in the summer months the permafrost is known to melt up to anywhere from six inches (6") to fifty feet (50') below ground level, thereby causing an unstable condition which is impassable to the common type of wheeled or tracked vehicles. It is the object of this invention to cover the said permafrost during the winter months with a layer of good insulating material, such as fiber glass or foam plastic, and to secure this area from drainage by sheet piling. Once this insulation material is properly placed and secured, the permafrost can be maintained at ground level through change of seasons and temperature rises. The layer of insulating material at ground level will maintain the temperature of the permafrost low enough to continuously provide a firm foundation, which in turn can support heavy loads throughout the year. In effect, the ground line will be bedrock.

Referring to the drawing, a cross-section of a proposed road illustrates this invention.

During approximately eight months of each year, ground 10 is solidly frozen up to ground level 12. During the summer months the upper portion of soil is heated and thaws to form a sticky morass, as is well known. Preferably during the winter months, a layer of good insulation material 14, such as fiber glass or polyurethane plastic is placed overlying the frozen earth. This insulation layer should be thick enough to prevent the heat from the sun penetrating therethrough and heating and melting the upper portion of the soil. Insulating material 14 also keeps the cold of the ground from escaping which also aids the soil in remaining substantially frozen during the periods of thaw.

Along the edges of the soil desired to be kept frozen, sheet piling 16 is forced into the ground to prevent drainage and to prevent the morass of the thawed soil from weakening the frozen foundation.

Over insulating layer 14 is placed a layer of gravel 18, and over gravel 18 is a layer of concrete 20. Frozen soil 10 acts like bedrock and is capable of supporting exceedingly large loads.

Since the thickness of the insulating layer 14 will vary according to the type of insulating material used, a basic equation allows the thickness to be easily determined. For example, the thickness of the insulation needed is given by the following equation, which can be obtained from "Conduction of Heat in Solids," by H. S. Carslow and J. C. Jaeger, Oxford Press, 1947, pages 40 to 60:

$$L = 2\left(\frac{k_i}{k_g} \times \frac{T_a - T_{ga}}{T_{gs} - T_g} \times \sqrt{d_g \times t}\right)$$

where:

$L$ = thickness of insulation
$k_i$ = conductivity of the insulation chosen
$k_g$ = conductivity of the particular ground, i.e., rocky, sandy, etc.
$T_a$ = ambient mean temperature for the warm period
$T_{gs}$ = temperature of ground surface
$T_g$ = average temperature of ground below surface, i.e., winter temperature
$d_g$ = diffusivity of ground
$t$ = time period of warm spell The conductivities and diffusivity of various materials are available from various standard texts, such as Mechanical Engineers' Handbook, by Lionel S. Marks, Fourth Edition, McGraw-Hill, 1941; Architectual Graphic Standards, by Charles Ramsey and Howard Sleeper, John Wiley & Sons, 1959; American Institute of Physics Handbook, McGraw-Hill, 1947.

In Architectural Graphic Standards, pp. 450 to 500, are given the conductivity of various insulating materials. The conductivity given for glass wool is .0001 in CTS units, while for typical ground composition the conductivity is of the order of .002 in CTS units. In the permafrost regions the second factor in the equation above becomes approximately unity, i.e., the mean temperature of the air above the ground surface temperature is about equal to the mean temperature difference between the ground surface and the deep permanently frozen regions.

As an example, to determine the thickness of insulation for a typical ground composition, where ground surface 12 is to remain at about 30° F., glass wool insulation is used as the insulating material, and the temperature of the air during the day rises above 30° F. to say 80° F. for about six months of the year, we have from the tables the equation:

$$L = 2\left(\frac{.0001}{.002} \times \frac{80 - 30}{30 - (-20)}\right.$$
$$\left. \times \sqrt{.002(6)^{\text{mo.}} \times \frac{30 \text{ day}}{\text{mo.}} \times \frac{86,400 \text{ sec.}}{\text{day}}}\right)$$

Where the diffusivity of the ground $d_g$ is .002 cm./sec.$^2$ and $L$ is in centimeters.

Of course, if the time period is less than six months, or the mean air temperature is lower, the thickness of insulation is reduced. The concrete cement layer 20 adds further insulation to layer 14 providing a safety factor.

While insulating layer 14 is shown covered by a layer of gravel 18, it could be covered by a concrete layer 20 directly or other form of rigid pavement or construction.

From the above explanation it is seen that the present invention eliminates the thawing of the upper portion of the frozen soil in the arctic and sub-arctic regions to form a stable condition and raises and maintains the frost line along ground level.

While the preferred embodiment was discussed in relation to arctic and sub-arctic areas, the present invention can be used in temperate zones as well. A layer of insulation material covering the ground surface in temperate zones will reduce frost heave to a minimum or even eliminate it, since the insulating material would keep the ground frozen and rigid until the final spring thaw.

While the present invention has been particularly shown and described with reference to a preferred embodiment thereof, it will be understood by those skilled in the art that various changes in form and details may be made therein without departing from the spirit and scope of the invention.

Having best described this invention, I claim:

1. Method of constructing a road in permafrost areas to prevent thawing of solid frozen ground which forms the base of the roadway, comprising determining the mean ambient temperature and duration during the summer months of the year, selecting the required thickness of an insulating covering material from known tables of insulating materials which will prevent a temperature rise in said base from its extreme frozen temperature to a surface thawing temperature during the summer months, placing said insulating material over the ground while said ground is in an extreme frozen condition, inserting sheet piles into said ground surface along opposite sides of the said road, and laying a road surface material over said insulating layer.

2. A method of constructing a base for supporting a hard surface material in permafrost areas to prevent thawing of solid frozen ground, comprising determining the mean ambient temperature and duration during the summer months of the year, selecting the required thickness of an insulating covering material from known tables of insulating materials which will prevent a temperature rise in said base from its extreme frozen temperature to a surface thawing temperature during the summer months, placing said insulating material over the ground while said ground is in an extreme frozen condition, and laying a hard surface material over said insulating material.

3. A hard surfaced road construction on frozen ground, comprising a layer of flexible insulating material disposed on the frozen ground surface along the roadway to form a firm foundation for said roadway during thawing periods, said layer of insulating material being of a predetermined thickness relative to the known mean ambient temperature of the air during said thawing periods to prevent a temperature rise in said frozen ground abutting said layer from the frozen temperature to a suface thawing temperature during said thawing periods, sheet piling inserted into the ground on opposite sides of the roadway, and a hard surface disposed between said sheet piling and above said insulating layer.

References Cited by the Examiner

UNITED STATES PATENTS

| | | | |
|---|---|---|---|
| 2,024,158 | 12/1935 | Gallagher | 94—7 |
| 2,044,498 | 6/1936 | Pearce | 94—4 |
| 2,183,253 | 12/1939 | Chambers | 94—7 |
| 3,110,981 | 11/1963 | Larner | 50—102 |

FOREIGN PATENTS

| | | |
|---|---|---|
| 517,831 | 10/1955 | Canada. |
| 460,473 | 1/1937 | Great Britain. |
| 787,303 | 12/1957 | Great Britain. |

JACOB L. NACKENOFF, *Primary Examiner.*